March 23, 1943.  J. J. WHARAM  2,314,568
MOTOR VEHICLE LOCK
Filed Oct. 4, 1940  2 Sheets-Sheet 1

INVENTOR.
John J. Wharam
Edwin C. McRae
BY
ATTORNEY

March 23, 1943. J. J. WHARAM 2,314,568
MOTOR VEHICLE LOCK
Filed Oct. 4, 1940 2 Sheets-Sheet 2

INVENTOR.
John J. Wharam.
Edwin C. McRae
BY
ATTORNEY

Patented Mar. 23, 1943

2,314,568

UNITED STATES PATENT OFFICE 2,314,568

MOTOR VEHICLE LOCK

John J. Wharam, Dearborn, Mich., assignor to Ford Motor Company, Dearborn, Mich., a corporation of Delaware Application October 4, 1940, Serial No. 359,663

15 Claims. (Cl. 70—252)

The object of my invention is to provide a motor vehicle lock of simple, durable and inexpensive construction.

A further object of my invention is to provide an improved lock by means of which the operator may lock the steering wheel of the vehicle and also lock the engine ignition circuit. The original form of such lock is known as a coincidental lock in the automobile industry and has been supplied as standard equipment on a large portion of the motor vehicles manufactured in the last ten years. My improved lock has certain advantages not incorporated in the older type of coincidental lock.

All of such locks in the past have been objectionable because the key-operated lock cylinder was placed adjacent to the steering column and, therefore, could not be considered one of the instruments associated with the instrument board. Consequently, the lock could not be grouped in with other instruments and, regardless of the design selected, still retained the appearance of an accessory or added instrument. An important reason for this invention was to clean up the appearance of the instrument panel and steering column by incorporating the lock in the panel and still retain the advantages of the coincidental lock.

A further object of this invention is to locate the lock cylinder where it can be conveniently illuminated by lights in the instrument panel. When the lock was located on the steering column the lighting arrangement used to illuminate the various instruments on the panel was not adapted for illuminating the lock cylinder and thus it was often difficult to insert the key into the lock at night due to the inadequacy of illumination. With my improved lock the key cylinder may be illuminated by lights in back of the panel, the same as is done in connection with the other instruments.

Still a further object of my invention is to provide a lock, the key-receiving portion of which is completely encased by the instrument panel of the car to thereby prevent injury to the occupants within the car in striking against the key. With the older types of locks unfavorable criticism and complaints have resulted, principally because these units have been placed in a protruding position such as to cause injury to the operator of the car by his striking against it.

Still a further object of my invention is to provide a steering gear and ignition circuit key-operated coincidental lock which may be operated by the actuation of only one control element, preferably the key itself. In all of the older types of coincidental locks the steering column was usually first unlocked by actuation of the key and then a separate switch was released for manual operation by the driver. This required two operations by the driver in either locking or unlocking the car. My improved lock may be operated by actuation of the key alone, thus dispensing with the other control while still retaining the added security of the coincidental lock.

Still a further object of my invention is to provide a lock housing which may be adjustable to thereby compensate for manufacturing variations in alignment between the instrument panel and the steering column.

With these and other objects in view, my invention consists in the arrangement, construction and combination of the various parts of my improved device, as described in this specification, claimed in my claims, and illustrated in the accompanying drawings, in which:

Figure 1:
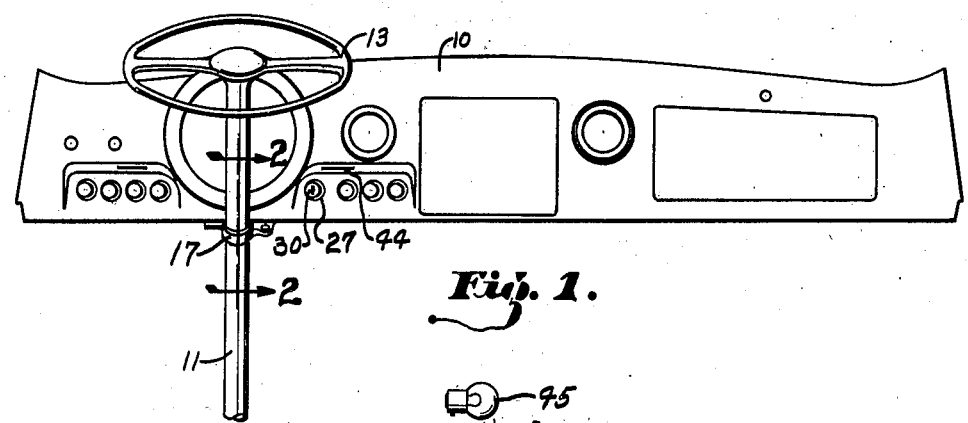
Figure 1 is an elevation of a motor-vehicle instrument panel and steering column having my improved lock installed thereon.

Referring to Figure 1 of the drawings, I have used the reference numeral 10 to indicate the instrument panel of a motor vehicle, said panel being positioned just above and forwardly of a steering column 11. The column 11 is of tubular form, having a steering shaft 12 rotatably mounted therein, which shaft has a steering wheel 13 secured to the upper end thereof. A collar 14 is fixed upon the shaft 12 at a point just beneath the instrument panel, which collar rotates with the shaft and which collar is provided with a longitudinally extending slot 15 therein into which a locking plunger 16 is moved when it is desired to lock the shaft 12 from rotation.

A supporting bracket 17 is clamped in the intermediate portion of the column 11 and is secured to the dash of the vehicle to support the intermediate portion of the steering column. The bracket 17 is provided with a sleeve member 18 formed integrally therewith, which sleeve extends upwardly and forwardly from the center of the bracket to position above the lower edge of the instrument panel 10. A shaft 19 is reciprocally mounted within the sleeve 18, which shaft is prevented from turning within the sleeve by means of a stop 20 which extends from the sleeve into a suitable keyway in the shaft 19.

The plunger 16 is reciprocally mounted in a suitable bore in the lower end of the shaft 19 and is resiliently urged downwardly by means of a compression spring 21. A stop 20 is inserted into the bore in the shaft 19, which coacts with a suitable flat 22 on the plunger 16 so that the outward movement of the plunger is limited. The plunger may be moved inwardly into the shaft 19 a considerable distance by compression of the spring 21.

Figure 2:
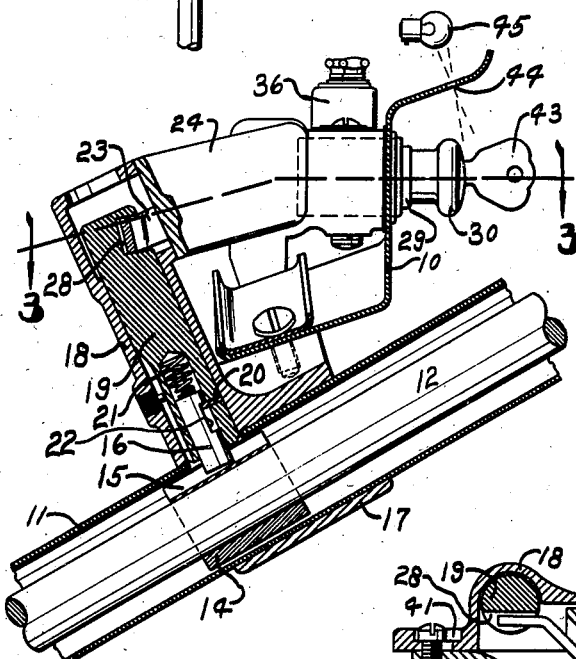
Figure 2 is a sectional view, taken upon the line 2—2 of Figure 1.
Figure 2:
Figure 3:
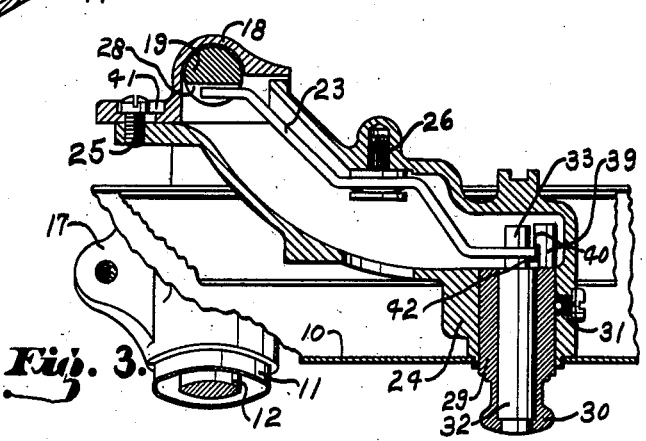
Figure 3 is a sectional view, taken upon the line 3—3 of Figure 2.

The function of parts so far described is quite conventional in that when the shaft 19 is moved downwardly to its locked position, as shown in Fig. 2, the spring 21 will urge the plunger 16 downwardly so that it will enter the slot 15 in the collar 14, if it is aligned therewith, or if the shaft 12 is in some other position, then the spring 21 will be compressed so that upon rotation of the shaft in either direction the plunger will eventually enter the slot, thereby locking the shaft against further rotation in either direction. When the shaft 19 is raised upwardly, the plunger 16 will be raised out of the slot 15 to allow free rotation of the steering gear shaft.

In order to conveniently reciprocate the shaft 19, I have provided a beam member 23 which is pivotally secured within a beam housing 24. The housing 24 is adjustably fastened to the upper end of the sleeve 18 for lateral movement by a screw 25, the head of which rides in a slot 41 in the upper end of the sleeve 18. The housing 24 extends from the sleeve 18 laterally to position spaced back of the instrument panel at one side of the steering column. The laterally spaced end of the housing 24 is aligned with an opening 27 in the instrument board. The beam 23 is pivotally mounted upon a pin 26 at the intermediate portion of the housing so that one end thereof is adjacent to the shaft 19 while the other end is in a position just back of the instrument board opening 27. A notch 28 is provided in the upper end of the shaft 19 into which the adjacent end of the beam 23 extends so that oscillation of the beam 23 will reciprocate the shaft 19 in the sleeve 18.

A key-operated cylinder lock is provided for oscillating the beam 23, the lock being so arranged that rotation of the key in one direction will unlock the steering column while rotation of the key in the opposite direction will lock the column. To accomplish this I have provided a cylindrical control member 29 which is mounted in the laterally spaced end of the housing 24. The member 29 is provided with a knob 30 which may be conveniently grasped by the operator. The member 29 is also reciprocally mounted so that it may be pulled out or pushed in to the housing 24. A spring-urged detent 31 is secured in the housing 24, which detent coacts with suitable notches in the member 29 so the member will stay in either its inner or outer position.

A lock cylinder 32 is mounted within the member 29, into which cylinder a key is rotatably mounted in the conventional manner. An eccentric pin 33 is secured to the inner end of the cylinder 32, which pin is adapted to extend into a slot 34 in the adjacent end of the beam 23.

Figure 4:
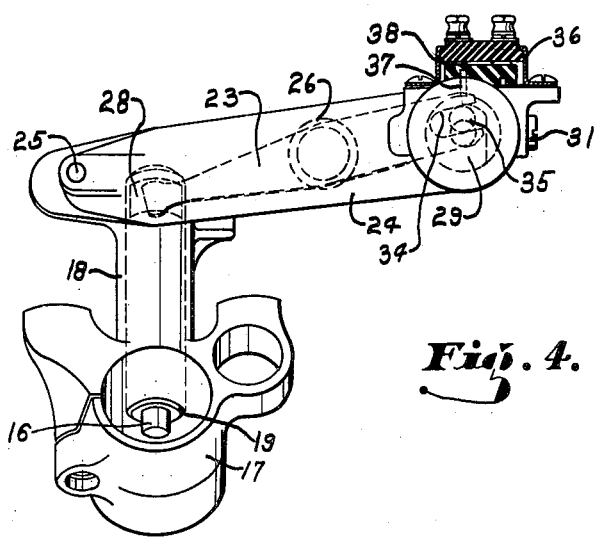
Figure 4 is a detailed view of the locking mechanism shown in Figure 1, the steering column and instrument board being eliminated to better illustrate the construction.
Figure 5:
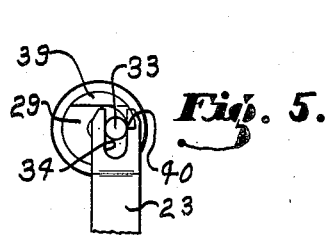
Figure 5 is a diagrammatic end view of the lock cylinder showing the position of the parts when the steering shaft is locked against rotation and the ignition switch is open.
Figure 6:
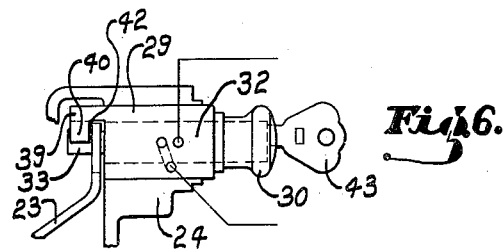
Figure 6 is a diagrammatic top view of the lock cylinder shown in Figure 5.

When the cylinder 32 is rotated to the position shown by dotted lines 35 in Fig. 4, the adjacent end of the beam 23 will be raised, which will push the shaft 19 downwardly, thereby locking the steering gear shaft from rotation. When the cylinder is rotated from the locked position through 180° the beam will be oscillated to thereby raise the shaft 19 and unlock the steering column shaft. The actuation of the key in this lock accomplishes the same purpose as in the ordinary coincidental lock. However, the means for synchronizing the operation of the ignition lock with the steering shaft lock is considerably different in this construction than in locks heretofore made.

I have provided an ignition switch 36 which is mounted upon the instrument panel end of the housing 24 just above the control member 29. The control member 29 has a pin 37 extending upwardly therefrom through a slot in the housing 24 into the switch 36 to actuate a movable member 38 in the switch 36. When the member 29 is pushed inwardly, the member 38 is actuated to open the ignition switch and when the member 29 is pulled outwardly, the pin 37 actuates the member 38 to close the switch circuit.

In a lock of this type the ignition switch must be inoperable when the steering column is locked. I have accomplished this by locking the member 29 against outward movement when the beam 23 is in its locked position. An extension 39 is provided on the inner end of the member 29 and an ear 40 extends downwardly from the outer end of this extension. The ear 40 is spaced from the end of the operating member 29 to form a slot 42 through which the adjacent end of the beam 23 may move.

When the knob 30 is pushed inwardly the beam 23 becomes aligned with the slot 42 so that the key cylinder may then be turned to thereby oscillate the beam 23 freely between the locked and the unlocked positions. When the beam is in its locked position the member 29 cannot be moved outwardly because of interference between the ear 40 and the beam 23. It is for this reason that when the steering shaft is locked the ignition switch cannot be turned on and inversely, when the ignition switch is on, then the steering column cannot be locked.

An important feature of this installation is that the instrument panel 10 is provided with a slot 44 therein directly above the knob 30 and one of the instrument board lights 45 is positioned behind the board directly above this slot so that the key opening will be illuminated by light from the light bulb 45. This provides much better illumination than is possible with the lock mounted upon the steering column.

Figure 7:
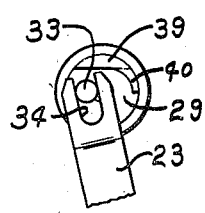
Figure 7 is a view similar to that shown in Figure 5 with the lock cylinder moved to its unlocked position.
Figure 8:
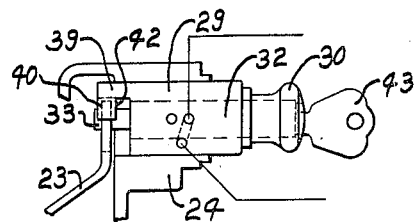
Figure 8 is a diagrammatic top view of the lock cylinder, shown in Figure 7.

In the operation of my improved lock, the operator first inserts a key 43 into the lock cylinder and rotates same to move the beam 23 to the unlocked position, shown in Fig. 7. This unlocks the steering shaft. The lock itself is of a type generally known in the trade as a conventional single-position barrel. This means that the operating key may be removed from the lock in one position of the barrel and in that one position only. This position in the present case, and in general practice, is that in which the key was originally inserted and in which the lock is locked. This type of lock has been used extensively for ignition locks in automotive vehicles for the past ten years. Its advantage, which has led to its use, is that the key may be removed only if the ignition is turned off, and thus the operator is not as likely to leave the car with the ignition turned on. He is thus assured that if he has the key to the lock, the ignition is shut off and the car is locked. The means provided for preventing the withdrawal of the key from the lock cylinder when the key is in the open position forms no part of this invention. Single position locks are constructed in different ways well known in the art. Such a lock, however, is particularly adapted in this device for since the key may not be removed when the lock is in the open position, the key itself serves as an operating handle for the locking device. The operator now pulls outwardly on the key itself to thereby move the lock cylinder and control member 29 outwardly to the position shown in Fig. 8. The ignition switch is turned on by this action.

It will be noted that the operator is only required to grasp one object, the key, to unlock both the steering shaft and the ignition circuit.

When the member 29 is in its outward position the key cannot be turned because of interference between the beam 23 and the ear 49. Thus, it is necessary to first push the member 29 inwardly thereby turning off the ignition switch before the steering shaft may be locked. This may also be accomplished by grasping the key only.

Among the many advantages arising from the use of my improved construction it may be well to mention that the entire locking unit is positioned behind the instrument panel so that a clean-cut appearance results and the instrument panel may be designed with the lock cylinder in harmonious relationship to the rest of the instruments.

Furthermore, the design of combined steering column and ignition lock is such that it is relatively simple to alter the position of the lock key to correspond to changes in design of the instrument panel from year to year so that the lock unit and the location and type of lock control may be made to harmonize with the appointments of the different car models, together with such other minor modifications that may be necessarily desirable. Therefore, because of the ease with which the present locking unit may be adapted to fit the requirements of different installations, it is understood that the scope of this invention will not be avoided by any variation within the definition of the claims attached hereto.

A further advantage of this construction is the ease with which the lock may be operated. In all other coincidental locks the operator must first insert the key into the lock cylinder, then rotate the key and then actuate still another lever to control the ignition switch. With my improved type of lock, the key, when inserted into the lock, cannot be withdrawn when unlocked so that the key may then be pulled outwardly to turn on the ignition. This makes the operation of the lock much simpler and closely approaches the ease of operation of the conventional single-acting ignition switch. The speed of operation, when it is desired to lock the car, is enhanced, as it is then only necessary, when inserting the key, to continue pushing the key to turn off the ignition switch, so that the key may then be turned and immediately withdrawn without any further operation. This is believed to be an advantage not found with any other type of coincidental lock with which the applicant is familiar.

Still a further advantage of this construction is that the key-receiving opening of the lock is arranged in such position that it may be readily illuminated from the instrument board by means equally as good as that formerly used to illuminate key-operated ignition locks.

Some changes may be made in the arrangement, construction and combination of the various parts of my improved device without departing from the spirit of my invention, and it is my intention to cover by my claims such changes as may reasonably be included within the scope thereof.

I claim as my invention:

1. In an automobile having a steering gear shaft and an ignition switch, a control member movably mounted in said automobile, a key-operated lock associated with said control member, said lock being actuated by movement of a key in one plane relative thereto, locking means extending from said lock to said shaft by means of which said shaft is locked and unlocked from rotation by said actuating movement of said key, said control member actuating said switch by movement thereof in another plane relative thereto, the movement of said control member to actuate said switch and movement of said shaft locking means being accomplished by the actuation of said key alone in each of said two planes.

2. In an automobile having a steering gear shaft and an ignition switch and an instrument panel, a housing extending between said instrument panel and said steering gear shaft, a control member reciprocally mounted in said housing in position adjacent to said instrument panel, said control member being aligned with an aperture in said panel, a key-operated lock mounted in said control member, said lock being actuated by oscillatory movement of said key in said lock, operating means extending through said housing from said lock to said shaft which locks and unlocks said shaft from rotation upon oscillatory movement of said key in said lock, means extending between said control member and said switch which operates said switch upon reciprocal movement of said control member, and means associated with said control member which prevents reciprocal movement thereof when said key-operated lock has been rotated to its locked position.

3. In an automobile having a steering column, an ignition circuit and an instrument panel, means to lock both said steering column and said ignition circuit by the operation of a lock control unit mounted on said instrument panel, said means comprising a lock cylinder forming a part of said lock control unit, a pin eccentrically located with reference to the axis of said lock cylinder and affixed to the inner end thereof, a bracket encasing a portion of said steering column, a plunger mounted in said bracket and extending outwardly of said steering column, said steering column having a locking recess lying adjacent to said plunger at some angular position of said steering column, a locking pin mounted within the lower portion of said plunger and normally protruding therefrom, means to cause movement of said plunger to and from said steering column to locked and unlocked positions upon the rotation of said lock cylinder, said means comprising a lever arm pivotally mounted intermediate of its ends, one end of said lever arm engaging said plunger, the opposite end of said lever arm engaging said eccentric pin of said lock cylinder, and control means for opening and closing said ignition circuit associated with said lock cylinder whereby said control means can be actuated only when said lock cylinder is in unlocked position.

4. In an automobile having a steering column, an ignition circuit and an instrument panel, means to lock both said steering column and said ignition circuit by the operation of a lock control unit mounted on said instrument panel, said means comprising a lock cylinder forming a part of said lock control unit, a pin eccentrically located with reference to the axis of said lock cylinder and affixed to the inner end thereof, said axis of said lock cylinder and the axis of said steering column being in substantially parallel vertical planes, a bracket encasing a portion of said steering column, a plunger mounted in said bracket and extending outwardly of said steering column, said steering column having a locking recess lying adjacent to said plunger at some angular position of said steering column, a locking pin mounted within the lower portion of said plunger and normally protruding therefrom, means to cause movement of said plunger to and from said steering column to locked and unlocked positions upon the rotation of said lock cylinder, said means comprising a lever arm pivotally mounted intermediate of its ends, one end of said lever arm engaging said plunger, the opposite end of said lever arm engaging said eccentric pin of said lock cylinder, and control means for opening and closing said ignition circuit associated with said lock cylinder whereby said control means can be actuated only when said lock cylinder is in unlocked position.

5. In an automobile having a steering column, an ignition circuit and an instrument panel, means to lock both said steering columns and said ignition circuit by the operation of a lock control unit mounted on said instrument panel, said means comprising a lock cylinder forming a part of said lock control unit, a pin eccentrically located with reference to the axis of said lock cylinder and affixed to the inner end thereof, a bracket encasing a portion of said steering column, a shaft mounted in said bracket and extending outwardly of said steering column, said steering column having a locking groove lying adjacent said shaft at some angular position of said steering column, a locking plunger mounted within the lower portion of said shaft and normally protruding therefrom, means to cause movement of said shaft to and from said steering column to locked and unlocked positions upon the rotation of said lock cylinder, said means comprising a lever arm pivotally mounted intermediate its ends, said lever arm being shaped to adapt said locking means to the configuration of said instrument panel, one end of said lever arm engaging said shaft, the opposite end of said lever arm engaging said eccentric pin of said lock cylinder, and control means for opening and closing said ignition circuit mounted on said instrument panel in association with said lock cylinder whereby said control means can be operated only when said lock cylinder is in unlocked position, said control means comprising a sleeve surrounding said lock cylinder, the outer portion of said sleeve forming a switch control knob, said ignition circuit being opened and closed by the inward and outward movement of said sleeve and lock cylinder relative to said instrument panel, said sleeve having an ear protruding from the inner portion theref, said ear being positioned adjacent said eccentric pin of said lock cylinder and adjacent said end of said lever arm engaging said eccentric pin, said ear forming a slotted portion into which the end of said lever arm is engaged when said lock cylinder is in locked position, thereby preventing reciprocal movement of said sleeve, and a housing encasing the entire locking means.

6. In an automobile having a steering-gear shaft, an ignition switch and an instrument panel, a control member mounted upon said instrument panel for movement relative thereto, a key-operated barrel lock mounted in said control member, means extending from said lock to said shaft which locks and unlocks said shaft to prevent and permit rotation of said shaft upon locking and unlocking movements of said key in said lock, said means including a plurality of relatively movable elements, said means including a protective housing and elements therein movable in relation thereto, and a second means extending from said control member to said switch which operates said switch by said movement of said control member and interlocking means between said control member and said first and second means.

7. A locking assembly for locking the steering and ignition of an automobile comprising two frames, the first frame being adapted at its outer end to receive and to be secured to the steering column of the automobile, a locking bolt shiftable in the inner end of said first frame for cooperation with the steering shaft extending through the steering column for locking or releasing said shaft, said second frame extending diagonally forwardly from the inner end of said first frame and terminating behind the instrument panel of the automobile at one side of the steering column, a switch on said second frame, an actuating element for said switch having its outer end projecting through said instrument panel for manipulation thereby of said actuating element for switch operation, key operable means in said switch actuating element, a transmission element in said second frome projecting into the first frame and there connected with said steering locking bolt, and a connection between the other end of said transmission element and said key operable means whereby turning of said key will operate said transmission element for shift of said bolt to steering locking or unlocking position.

8. A locking assembly for locking the steering and ignition of an automobile comprising two frames, the first frame being adapted intermediate its ends to receive and to be secured to the steering column of the automobile, a locking bolt shiftable in the inner end of said first frame for cooperation with the steering shaft extending through the steering column for locking or releasing said shaft, said second frame extending diagonally forwardly from the inner end of said first frame and terminating behind the instrument panel of the automobile at one side of the steering column, a switch on said second frame, an actuating element for said switch having its outer end projecting through said instrument panel for manipulation thereby of said actuating element for switch operation, key operable means in said switch actuating element, a transmission element in said second frame projecting into the first frame and there connected with said steering locking bolt, and a connection between the other end of said transmission element and said key operable means whereby turning of said key will operate said transmission element for shift of said bolt to steering locking or unlocking position, and means securing said frames at their outer ends to the instrument panel.

9. A steering post and ignition locking assembly for an automobile comprising two frames located behind the automobile instrument panel, the first frame being adapted to be secured to the steering column of the automobile, a locking bolt shiftable in the inner end of said first frame for cooperation with the steering post in said column for locking or unlocking thereof, a separable and adjustable connection between the inner end of said second frame and the inner end of said first frame, said second frame extending diagonally forwardly and being secured at its forward end to the instrument panel, a switch on said second frame, an actuating element in said second frame for said switch having its outer end projecting through the instrument panel whereby it may be manipulated for switch actuation, a key operable element in said switch actuating element and a cam member at the inner end of said key operated element, and a lever fulcrumed in said second frame, said lever being connected at its inner end to said locking bolt and having connection at its outer end with said cam element whereby upon turning of said key operated element said bolt may be shifted for locking or unlocking of the steering shaft.

10. A steering and ignition locking assembly for an automobile comprising a frame structure adapted to be secured to the steering column of an automobile, a locking bolt shiftable in said frame structure for engagement with the steering shaft in said column for locking thereof, a switch on said frame structure, a switch actuating element shiftable axially in said frame, a key operable element rotatable in said switch actuating element, a cam element on the inner end of said key operable element, a lever fulcrumed in said frame structure and connected at one end with said locking bolt and at its other end with said cam element whereby upon turning of said key operable element said lever will be rocked to shift the locking bolt to locking or unlocking position, and a locking element on said switch actuating element co-operable with said lever to lock said switch actuating element against movement for switch closure while said steering locking bolt is in locking position and to lock said lever against movement to shift said locking bolt to locking position while said actuating element is in position for switch closing.

11. In an automobile having a steering shaft and an instrument panel, a locking structure mounted adjacent to the steering shaft and having a locking bolt shiftable to lock or unlock said shaft, a switch structure remote from said lock structure and located behind and secured to said panel, said switch structure comprising a switch and an axially shiftable actuating member therefor accessible from in front of said panel, a lock barrel key rotatable in said switch actuating member, and a connection between said barrel and said steering locking bolt whereby turning of said barrel will effect movement of said bolt to locking or unlocking position.

12. In an automobile, having a steering shaft and an instrument panel, a locking structure mounted adjacent to said shaft and having a locking bolt shiftable to lock said shaft against operation, a switch structure remote from said lock structure located behind and secured to said panel, said switch structure comprising a switch and an actuating element therefor accessible from the front of said panel, said actuating element being nonrotatable but axially shiftable in said switch structure for operation of said switch, a key operable lock barrel in said switch actuating member, and means for transmitting the rotation of said barrel to said steering locking bolt whereby turning of said barrel will effect movement of said bolt to locking or unlocking position.

13. In an automobile, having a steering shaft and an instrument panel, a locking structure mounted adjacent to said shaft and having a locking bolt shiftable to lock said shaft against operation, a switch structure remote from said lock structure located behind and secured to said panel, said switch structure comprising a switch and an actuating element therefor accessible from the front of said panel, said actuating element being nonrotatable but axially shiftable in said switch structure for operation of said switch, a key operable lock barrel in said switch actuating member, means for transmitting the rotation of said barrel to said steering locking bolt whereby turning of said barrel will effect movement of said bolt to locking or unlocking position, and means movable with said switch actuating member and co-operable with said transmitting means for locking said transmitting means against operation for movement of said locking bolt to locking position when said actuating member is in switch closing position and for preventing switch closing movement of said actuating member when said locking bolt is in steering locking position.

14. A steering and ignition locking assembly for an automobile comprising a frame structure adapted to be secured to the steering column of an automobile, a locking bolt shiftable in said frame structure for engagement with the steering shaft in said column for locking thereof, a switch on said frame structure, a switch actuating element shiftable axially in said frame, a key operable element rotatable in said frame structure, a cam member on the inner end of said key operable element, a lever fulcrumed in said frame structure and connected at one end with said locking bolt and at the other end with said cam member whereby upon turning of said key operable element said lever will be rocked to shift said locking bolt to locking or unlocking position, and a locking element on said switch actuating element co-operable with said lever to lock said switch actuating element against movement for switch closure while said steering locking bolt is in locking position and to lock said lever against movement to shift said locking bolt to locking position while said actuating element is in position for switch closure.

15. In an automobile having steering column, an ignition circuit and an instrument panel, means to lock said steering column and said ignition circuit by the operation of a lock control unit mounted on said instrument panel, said means comprising a lock cylinder forming a part of said control unit, a pin eccentrically located with reference to the axis of said lock cylinder and affixed to the inner end thereof, a bracket encasing a portion of said steering column, a plunger mounted in said bracket and extending outwardly of said steering column, said steering column having a locking recess lying adjacent to said plunger at some angular position of said steering column, a locking pin mounted within the lower portion of said plunger and normally protruding therefrom, means to cause movement of said plunger to and from said steering column to locking or unlocking position upon rotation of said lock cylinder, said means comprising a lever arm pivotally mounted intermediate its ends, one end of said lever engaging said plunger, the other end of said lever engaging said eccentric pin of said lock cylinder, control means for opening and closing said ignition circuit, and interlocking means between said switch control means and said lever effective to lock said switch actuating means against switch closure when the locking plunger is in locking position and to prevent said lever from effecting movement of said plunger to locking position while said switch is closed.

JOHN J. WHARAM.